United States Patent
Curtin

(10) Patent No.: US 7,292,318 B2
(45) Date of Patent: Nov. 6, 2007

(54) SYSTEM AND METHOD FOR GENERATING THRUST AT REMOTE OBJECTS

(75) Inventor: Mark S. Curtin, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 11/128,994

(22) Filed: May 13, 2005

(65) Prior Publication Data

US 2006/0256318 A1    Nov. 16, 2006

(51) Int. Cl.
*G01P 3/36* (2006.01)
(52) U.S. Cl. ............... 356/28; 356/28.5; 356/622; 219/121.69
(58) Field of Classification Search ............ 356/28
See application file for complete search history.

(56) References Cited

U.S. PATENT DOCUMENTS

| 2003/0019852 | A1* | 1/2003 | Kaplan et al. | 219/121.68 |
| 2003/0184730 | A1* | 10/2003 | Price | 356/39 |
| 2003/0223037 | A1* | 12/2003 | Chernyak | 351/209 |
| 2005/0236379 | A1* | 10/2005 | Nelson et al. | 219/121.69 |

* cited by examiner

*Primary Examiner*—Thomas H. Tarcza
*Assistant Examiner*—Tim Brainard
(74) *Attorney, Agent, or Firm*—Ingrassia Fisher & Lorenz, P.C.

(57) ABSTRACT

A system and method for detecting thrust in a remote object is disclosed herein. The system is suitable for use in connection with midcourse discrimination systems that distinguish actual targets of interest, such as warheads, from decoys. The system directs laser pulses at the remote object under observation. The system directs at least one initial laser pulse at the remote object to heat the surface material of the remote object and to create an outgas environment near the remote object. The system also directs at least one secondary laser pulse at the outgas environment, which creates very high peak power filaments that bombard the surface of the remote object. The filaments ablate the surface material of the remote object, ejecting mass away from the remote object at a high velocity. The ejection of mass imparts thrust to the remote object, resulting in an imparted differential velocity dependent on the mass of the remote object. The magnitude of the imparted differential velocity allows assessment of whether the remote object is a relatively massive target of interest or a countermeasure having relatively low mass.

19 Claims, 4 Drawing Sheets

SYSTEM AND METHOD FOR GENERATING THRUST AT REMOTE OBJECTS

TECHNICAL FIELD

The present invention relates generally to systems for observing and interacting with distant objects. More particularly, the present invention relates to a system and method for generating thrust at remote or distant objects, which may be suitable for use in connection with a midcourse discrimination technique in a missile defense system.

BACKGROUND

Practical missile defense systems must consider the efficient use of limited defensive resources. The deployment of decoys and other countermeasures is a typical strategy employed to cause defense systems to exhaust their defensive resources on non-critical targets. A midcourse discrimination system is designed to reliably differentiate between true threats and false threats referred to as decoys. To date, the development of reliable, robust midcourse discrimination techniques that offer a degree of immunity to envisioned countermeasures have not been demonstrated. Many of the envisioned midcourse discrimination techniques rely on large, expensive systems that are typically space-based. Other proposed systems include specialized or customized equipment that is expensive and not readily available from equipment manufacturers.

Accordingly, it is desirable to have a robust system that efficiently and effectively differentiates between targets of interest (such as warheads) and countermeasures (such as decoy balloons). In addition, it is desirable to have a non-space-based midcourse discrimination system that employs relatively mature, inexpensive subsystems and components. Furthermore, other desirable features and characteristics of the present invention will become apparent from the subsequent detailed description and the appended claims, taken in conjunction with the accompanying drawings and the foregoing technical field and background.

BRIEF SUMMARY

A system configured in accordance with an embodiment of the invention provides robust, stand-off capability to efficiently induce a velocity/position signature on a remote object, enabling differentiation between targets of interest and decoys. Fundamentally, the system incorporates a method for inducing thrust at a remote object. In practice, the system can utilize existing and relatively inexpensive subsystem technologies to enable cause-and-effect signatures on targets and decoys, where such signatures are directly dependent upon the mass of the interrogated object. The system need not employ a space-based platform to achieve the desired effect, which significantly reduces the cost of implementation. The system offers significant immunity to potential countermeasures meant to thwart current discrimination techniques.

The above and other aspects of the invention may be carried out in one form by a method for inducing thrust at a remote object. The method involves generating one or more initial laser pulses having characteristics that promote outgassing of a surface material of the remote object, transmitting the initial laser pulses toward the remote object, generating one or more secondary laser pulses having characteristics that promote filamentation in response to outgassing of the surface material, and transmitting the secondary laser pulses toward the remote object.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of practical tracking, detection, and/or midcourse discrimination systems, and that the system described herein is merely one exemplary application for the invention.

For the sake of brevity, conventional techniques related to laser pulse generation and transmission, laser optics, radar and other tracking systems, missile defense, counter-countermeasure systems, data processing, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
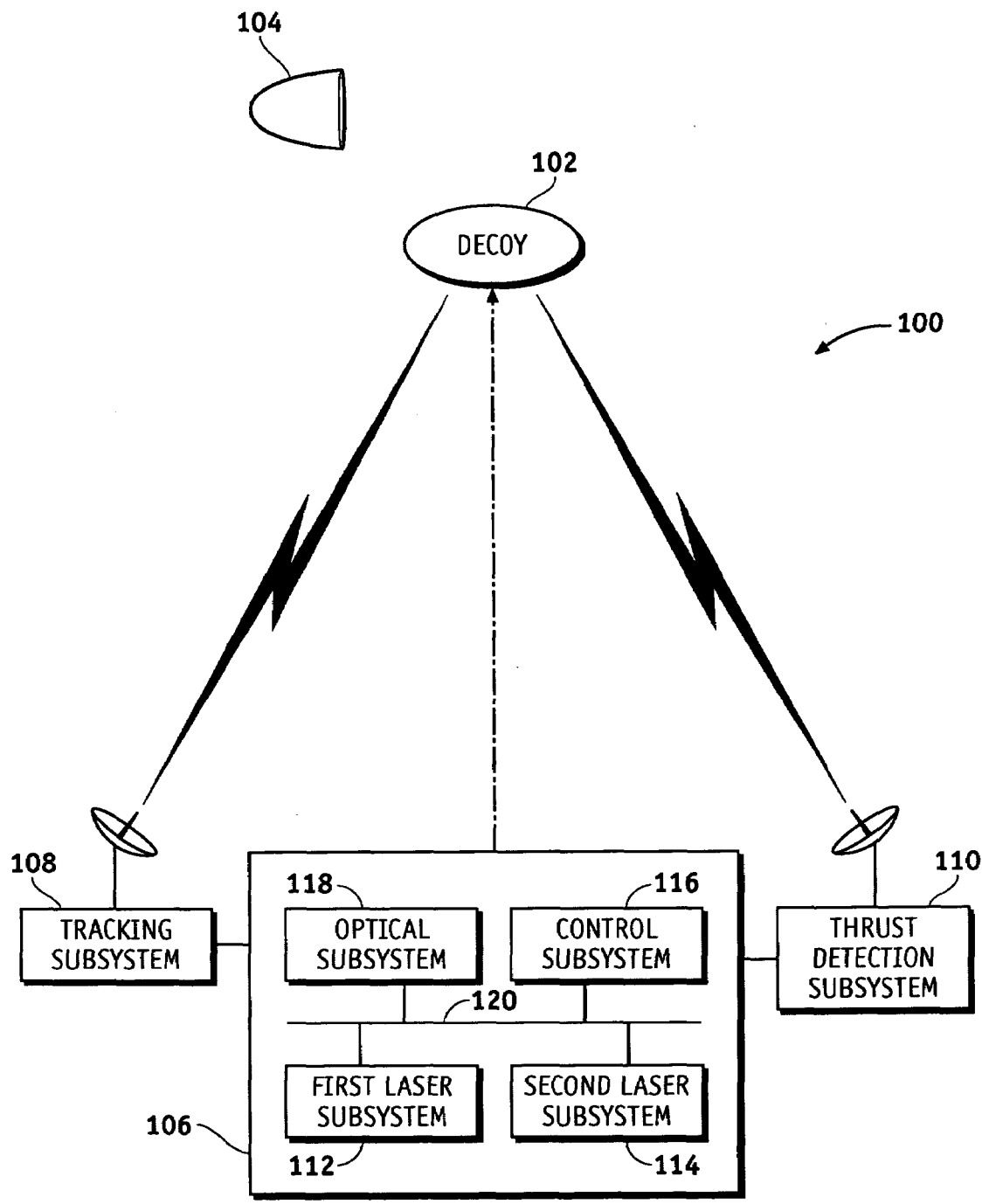
FIG. 1 is a schematic representation of a system, configured in accordance with an example embodiment of the invention, for detecting thrust at a remote object.

The following description refers to components or features being "connected" or "coupled" together. As used herein, unless expressly stated otherwise, "connected" means that one component/feature is directly or indirectly connected to another component/feature, and not necessarily mechanically. Likewise, unless expressly stated otherwise, "coupled" means that one component/feature is directly or indirectly coupled to another component/feature, and not necessarily mechanically. Thus, although FIG. 1 depicts one example arrangement of elements, additional intervening elements, devices, features, or components may be present in an actual embodiment (assuming that the functionality of the system is not adversely affected).

As used herein, "outgassing" refers to the process whereby gas is expelled from a material, or the evolution of embedded gas from a material, and "outgas" refers to the molecules or atoms expelled as a result of outgassing. In a vacuum or near vacuum environment, outgassing increases with an increase in the temperature of the material.

A practical system configured in accordance with the invention generates thrust at a distant object using a laser system to create a localized gas distribution at the remote object. The local gas environment enables laser pulses to filament at the remote object. The optical filaments have a very high power density that causes ablation of the surface material of the target object, which imparts thrust to the target object. The system enables laser systems to quickly, reliably, and efficiently generate thrust at remote objects (such as targets in outer space or ballistic targets traveling at very high altitudes). In turn, the imparted thrust allows existing velocity and/or position measuring systems to differentiate between decoys and targets of interest.

A method according to an example embodiment of the invention involves generating a train of laser pulses including initial laser pulses having characteristics that promote outgassing of a surface material of the remote object and secondary laser pulses having characteristics that result in filamentation of these pulses when they interact with the outgassed products generated by the initial laser pulse/ pulses. The method also involves efficiently transmitting the train of laser pulses to the remote object and generating the conditions that induce the secondary laser pulses to filament prior to the surface of the remote object for the purpose of ablating the surface material and maximizing thrust imparted to the remote object.

One practical embodiment of the invention employs multiple laser subsystems to generate a sequence of laser pulses for transmission to the remote object. One or more lead or initial laser pulses are used to generate or enhance an effect at the surface material of the remote object to create a spatially localized condition that allows subsequent laser pulses to filament (transform from relatively low power density pulses to relatively high power density pulses) prior to interaction with the illuminated object. In this regard, the initial laser pulses are suitably generated by a laser subsystem that is configured to generate increased or enhanced gas emission from the surface material of the remote object, and the subsequent laser pulses are suitably generated by a laser subsystem such that the subsequent laser pulses time-compress along the propagation path so as not to exceed the critical power ($P_{crit}$) required for self-focusing until the laser pulses reach the outgas liberated by the initial laser pulses. Suitable optimization of the separation of the initial laser pulses and the secondary laser pulses enhances the probability of the secondary laser pulses filamenting prior to interacting with the surface of the remote object. The optical power density within the filaments is of such a magnitude that the interaction with the remote object causes ablation at the surface of the remote object. In this regard, ablation is an extremely efficient methodology for generating thrust because ablation ejects a portion of the remote object mass at very high velocities, giving rise to a momentum transfer to the remote object (which follows the principle of conservation of momentum).

FIG. 1 is a schematic representation of a system 100 configured in accordance with an example embodiment of the invention. System 100 is preferably configured to induce thrust at a remote object 102 and to detect the induced thrust using existing tracking, monitoring, and/or detection methodologies. System 100 may be ground-based, aircraft-based, satellite-based, or the like, and certain aspects and features of system 100 described herein may need to be modified or optimized to suit the particular deployment of system 100. In the example deployment described herein, which is not intended to limit the application of the invention in any way, system 100 represents a component of a missile defense system and, in particular, a midcourse discrimination system designed to differentiate a remote object 102 from a target of interest 104. As used herein, remote object 102 may be: a countermeasure, such as a decoy balloon or any low-mass object meant to conceal the true identity of a threat; a missile; a rocket; an aircraft; a warhead; or any distant object under investigation. As used herein, target of interest 104 may be: a missile; a rocket; an aircraft; a warhead; or any distant object under investigation. In the practical deployment described herein, target of interest 104 is a missile or warhead assumed to travel along a ballistic trajectory, while remote object 102 is a countermeasure such as a decoy balloon. In this regard, the mass of target of interest 104 will be significantly greater than the mass of remote object 102. Furthermore, in the practical deployment described herein, remote object 102 is located at a very high altitude (on the order of mega-meters for a ground-based system 100), such as low orbit or outer space, where the surrounding environment approaches a vacuum.

System 100 may include a laser system 106, a tracking subsystem 108 coupled to laser system 106, and a thrust detection subsystem 110 coupled to laser system 106. In a practical application, tracking subsystem 108 or portions thereof may be incorporated into laser system 106 and/or into thrust detection subsystem 110. Likewise, thrust detection subsystem 110 or portions thereof may be incorporated into laser system 106 and/or into tracking subsystem 108. Laser system 106 may include a first laser subsystem 112, a second laser subsystem 114, a control subsystem 116, and an optical subsystem 118. These subsystems may be coupled together via a data communication bus 120 (or any suitable connection architecture). Although not shown in FIG. 1, laser system 106 may include additional hardware, software, firmware, or functional elements that are traditionally associated with general purpose computing platforms, e.g., microprocessors, memory, displays, or the like. In a practical embodiment, the subsystems of laser system 106 may be combined into any number of functional elements or components, and the separate block representation shown in FIG. 1 is merely intended to provide a convenient tool for purposes of the following description.

With regard to laser system 106, tracking subsystem 108, and thrust detection subsystem 110, and in accordance with the practices of persons skilled in the art of computer platforms, the invention may be described herein with reference to symbolic representations of operations that may be performed by the various computing components or devices. Such operations are sometimes referred to as being computer-executed, computerized, software-implemented, or computer-implemented. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software or firmware, various elements of the systems described herein (which may reside at laser system 106, tracking subsystem 108, and/or thrust detection subsystem 110) are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In accordance with one practical embodiment, laser system 106 utilizes high peak power laser technology in lieu of high average power laser technology. High peak power laser technology is relatively mature, commercially available, and relatively inexpensive in comparison to high average power laser technology. Briefly, laser system 106 is configured to illuminate remote object 102 with a sequence of laser pulses in a manner that induces thrust at remote object 102. If remote object 102 is of relatively low mass, the induced thrust will result in a change in velocity of remote object 102. On the other hand, if remote object 102 is of relatively high mass, the induced thrust will have little or no detectable effect on the velocity of remote object 102. Thrust detection subsystem 110 is suitably configured to differentiate between high mass and low mass objects in response to the illumination of remote object 102 by laser system 106.

First laser subsystem 112 is configured to generate one or more initial laser pulses having characteristics that promote outgassing of a surface material of remote object 102. In practice, first laser subsystem 112 may be realized as a Q-switched laser subsystem or a quasi-CW laser subsystem. The wavelength, pulse width, number of initial pulses, optical pulse energy, transmit beam diameter or spot size, power density, pulse frequency, spectral content and/or other characteristics of the initial laser pulse(s) may be selected to promote enhanced outgassing of the anticipated surface material of remote object 102, and optimized transmission of pulse energy and energy density to the remote object. In practice, the initial laser pulses are configured to increase the temperature of an area of the surface material to promote outgassing in a localized region proximate to remote object 102. As one example, the initial laser pulses can be generated by a Q-switched laser subsystem that produces 5-10 nanosecond pulses having a relatively large transverse "cross sectional" area. Furthermore, although the diversity of surface materials can be very broad, a practical embodiment may employ Q-switched lasers operating in the Near Infrared ("NIR") spectral regime (1.0 micron to 2.0 micron).

Optical subsystem 118 is suitably configured to transmit the initial laser pulses toward remote object 102. In accordance with known laser transmission, focusing, reflecting, directing, refracting, and/or aiming techniques, optical subsystem 118, which may be controlled by control subsystem 116 and/or by tracking subsystem 108, directs the initial laser pulses toward remote object 102 such that, after propagating through the intervening environment and atmosphere, the initial laser pulses illuminate the surface of remote object 102. In a practical deployment, the specific configuration and size of the optical components will depend upon variables such as, without limitation: the optical wavelength; the focal length; and the desired target spot size.

Second laser subsystem 114 is configured to generate one or more secondary or subsequent laser pulses having characteristics that promote filamentation in response to the outgassing of the surface material of remote object 102. Although second laser subsystem 114 is depicted as a separate block in FIG. 1, it may be combined with first laser subsystem 112 in a practical deployment of system 100. In practice, second laser subsystem 114 may be realized as an ultra-short pulse laser subsystem. The wavelength, pulse width, number of secondary pulses, optical pulse power, transmit beam diameter or spot size, power density, pulse frequency, spectral distribution, polarization, and/or other characteristics of the secondary laser pulses may be selected according to the anticipated propagation environment, the anticipated propagation distance, and/or the anticipated outgas environment.

Second laser subsystem 114 is preferably configured to generate secondary laser pulses that are tailored to time-compress along the propagation path so as not to exceed the critical power threshold required for self-focusing until the secondary pulses reach the outgas environment proximate to the remote object 102. Such time-compression of the secondary laser pulses (i.e., chirping) occurs as the pulses propagate through the atmosphere, resulting in shorter pulses corresponding to higher energy densities. Simply stated, the secondary laser pulses increase in optical pulse power with increasing altitude. In practice, the secondary laser pulses are configured such that the outgas environment created by the initial laser pulse (or pulses) causes filamentation of the secondary laser pulses into a number of filaments having high power density relative to the secondary laser pulses. In turn, the concentrated filaments ablate the surface material of remote object 102, resulting in ejection of a portion of the surface material away from remote object 102. In a typical application, the secondary laser pulses are generated and transmitted immediately following the generation and transmission of the initial laser pulses. The time period between the initial and secondary laser pulses is short enough such that the outgas environment created by the initial laser pulses is still present when the secondary laser pulses reach the remote object 102.

In one example embodiment, second laser subsystem 114 is separate and independent from first laser subsystem 112, and the initial laser pulses have significantly different characteristics than the secondary laser pulses. For instance, the initial laser pulses will likely be of higher average energy than the secondary laser pulses, and the initial and secondary laser pulses need not have the same wavelength.

Optical subsystem 118 is also configured to transmit the secondary laser pulses toward remote object 102. In this regard, optical subsystem 118 may include two separate optical arrangements that individually support the two laser subsystems, or optical subsystem 118 may be realized as an integrated optical arrangement configured to support both laser subsystems. In accordance with known laser transmission, focusing, reflecting, directing, refracting, and/or aiming techniques, optical subsystem 118, which may be controlled by control subsystem 116 and/or by tracking subsystem 108, directs the secondary laser pulses toward remote object 102 such that, after propagating through the intervening environment and atmosphere, the secondary laser pulses pass through the outgas environment and form filaments. In turn, the filaments illuminate and interact with the surface material of remote object 102. In a practical deployment, the specific configuration and size of the optical components will depend upon variables such as, without limitation: the optical wavelength; the focal length; and the desired target spot size.

Tracking subsystem 108, which is coupled to laser system 106, is suitably configured to track the current position of remote object 102, target of interest 104, and possibly any number of distant objects and targets. Tracking subsystem 108 obtains accurate real-time position coordinates for the distant objects, and such position coordinates may be utilized by laser system 106 (or any component thereof) to accurately illuminate remote object 102. Accordingly, tracking subsystem 108 may be coupled to control subsystem 116 (and/or to any of the components of laser system 106 via data communication bus 120) to facilitate the transfer and processing of the position coordinates. In a practical deployment of system 100, tracking subsystem 108 may leverage known radar technologies (e.g., X-band radar systems), imaging technologies (e.g., telescope and related tracking systems), and the like, which may be commercially available or already deployed in connection with existing commercial tracking systems, military defense systems, academic research systems, or the like.

Thrust detection subsystem 110, which is coupled to laser system 106, is suitably configured to determine whether the transmission of the initial and secondary laser pulses induces thrust at remote object 102. Briefly, thrust detection subsystem 110 calculates a velocity differential based upon on the velocity of remote object 102 before and after illumination by the initial and secondary laser pulses, and makes a decision based upon the velocity differential. The manner in which thrust detection subsystem 110 detects thrust at remote object 102 is described in more detail below. In practice, thrust detection subsystem 110 may leverage the position coordinates obtained by tracking subsystem 108. Alternatively (or additionally), thrust detection subsystem 110 may be configured to independently track the current position of remote object 102 using any of the techniques, methodologies, and systems described above in connection with tracking subsystem 108.

Figure 2:
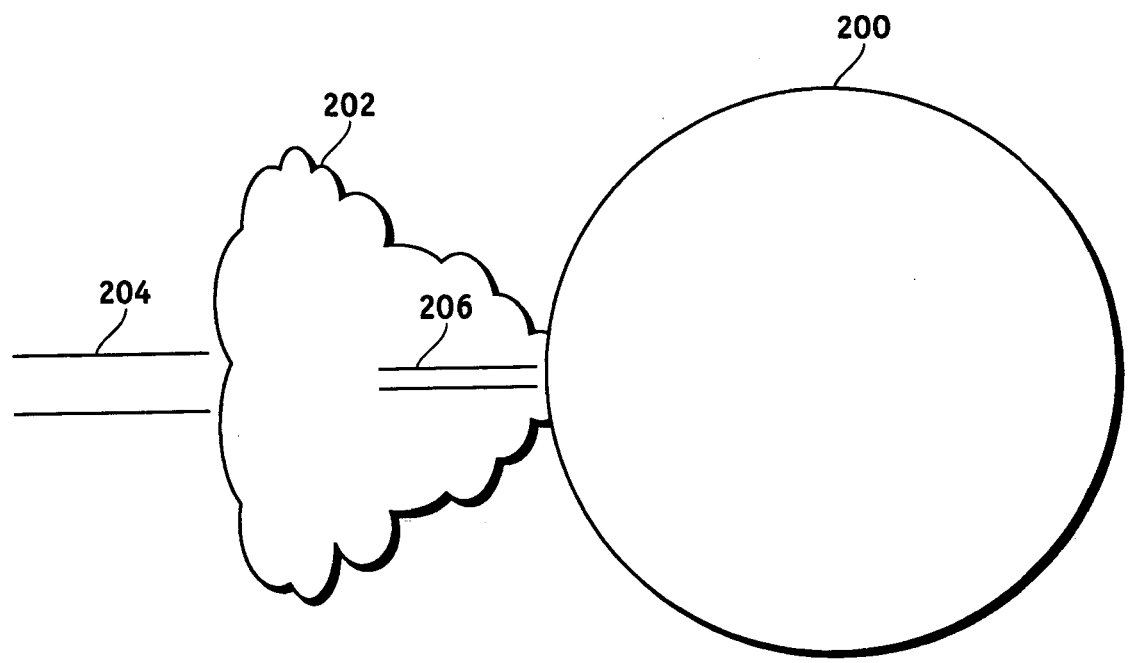
FIG. 2 is a diagram that depicts filamentation of laser pulses caused by an outgas environment proximate to a remote object.
Figure 3:
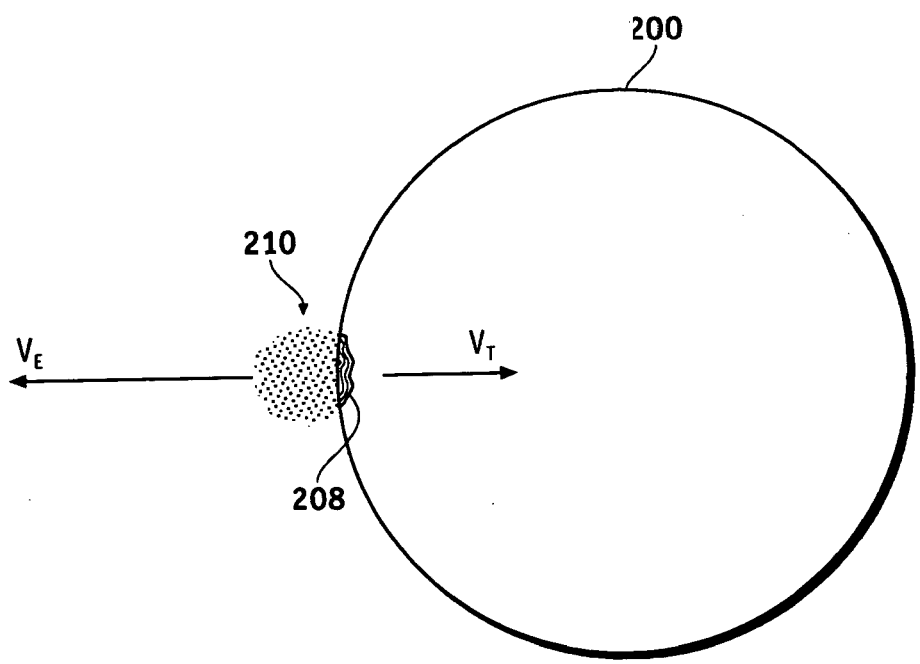
FIG. 3 is a diagram that depicts ablation and ejection of surface material of the remote object shown in FIG. 2.

The manner in which thrust is imparted to remote object 102 will be described in more detail with reference to FIGS. 2-5. FIG. 2 is a diagram that depicts filamentation of laser pulses caused by an outgas environment proximate to a remote object 200, and FIG. 3 is a diagram that depicts ablation and ejection of surface material of remote object 200 caused by filament laser pulses. Remote object 200 may be a target of interest, a missile decoy, or any distant object as described above in connection with system 100. Remote object 200 is located at a very high altitude in a near-vacuum environment. FIG. 2 represents a time following the illumination of remote object with an initial laser pulse (or pulses), i.e., a time after outgassing of the surface material of remote object 200 has occurred. Again, the initial laser pulses heat the surface material of remote object 200, causing enhanced outgassing of the surface material into the environment surrounding remote object 200 and formation of an outgas environment 202. FIG. 2 schematically depicts outgas environment 202 that is produced in response to the initial laser pulses.

Outgas environment 202 has a characteristic nonlinear index of refraction that, when large enough, initiates filamentation in secondary laser pulses 204 having the characteristics described above. For ease of description, secondary laser pulses 204 are depicted as a beam in FIG. 2. Secondary laser pulses 204 interact with outgas environment 202, which causes secondary laser pulses 204 to collapse in the transverse dimension. This reaction significantly increases the intensity of each secondary laser pulse 204 and creates a number of high intensity filaments 206. In other words, filaments 206 have high energy density relative to secondary laser pulses 204. In practice, all of the energy from one secondary laser pulse 204 need not appear in one filament 206, and the energy from one secondary laser pulse 204 may be dispersed in any number of filaments 206. The creation of filaments 206 is governed by nonlinear processes associated with outgas environment 202. In practice, outgas environment 202 will extend from the surface of remote object 200, which facilitates the creation of filaments 206 within outgas environment 202. Notably, the filamentation of secondary laser pulses 204 results in filaments 206 having a spot size on the order of 100 microns, in comparison to the larger meter-class spot size of secondary laser pulses 204. For ease of description, filaments 206 are depicted as a narrow beam within outgas environment 202 in FIG. 2.

FIG. 3 represents a time following the illumination of remote object 200 with one or more high power density filaments 206. The time period of illumination of remote object 200 by filaments 206 is very brief compared to the time required for the surface material of remote object 200 to dissipate heat. Consequently, the high intensity of filaments 206 ablate the surface material of remote object 200. No realistic material can withstand the high intensity of filaments 206, which can be on the order of $10^{13}$ watts/cm². In other words, filaments 206 immediately reduce a portion of the surface material into its associated molecules or atoms. The highly localized and concentrated nature of filaments 206, however, does not result in the destruction of remote object 200. For purposes of illustration, FIG. 3 depicts an ablation area 208 of remote object 200 and ejected material 210, which may represent particles, molecules, or atoms liberated from the surface material of remote object 200.

Even though only a small amount of ejected material 210 may be liberated from remote object 200, the ejected material 210 leaves remote object 200 at a very high velocity (which results from the rapid ablation occurring at the surface of remote object 200). This relatively high velocity is indicated by the large magnitude velocity vector $V_e$ in FIG. 3. Conservation of momentum dictates that the velocity of remote object 200 will increase in the direction opposite ejected material 210. In this regard, the velocity differential for the remote object may be expressed as follows:

$$\Delta V \approx \sqrt{\frac{2 \cdot m_e \cdot E_{filament}}{m^2}},$$

where $m_e$ is the ejected mass of surface material, $E_{filament}$ is the energy of the filaments, and m is the mass of the remote object. Since the mass of remote object 200 is significantly greater than the mass of ejected material 210, the induced velocity of remote object 200 will be less than the velocity of ejected material 210. This relatively low thrust velocity is indicated by the small magnitude velocity vector $V_t$ in FIG. 3. If remote object 200 is relatively massive (e.g., a missile), then $V_t$ might be undetectable. On the other hand, if remote object 200 has relatively little mass (e.g., a decoy balloon), then $V_t$ will be detectable and/or measurable by ground or aircraft based tracking systems such as thrust detection subsystem 110.

Figure 4:
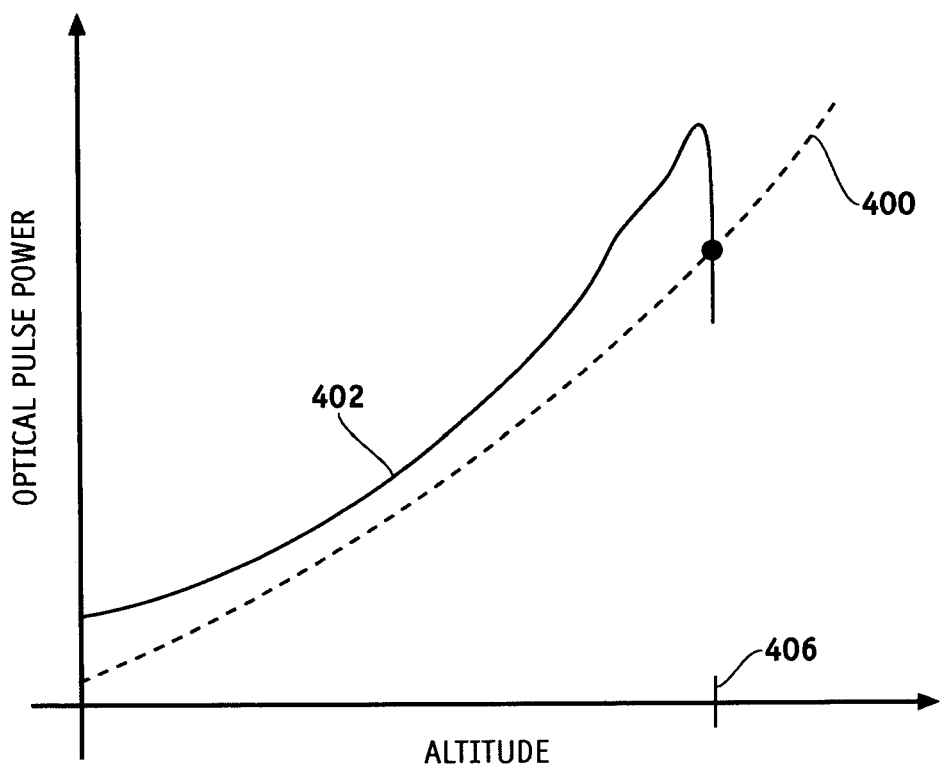
FIG. 4 is a graph depicting the optical pulse power of laser pulses versus altitude, along with a graph depicting the filamentation power requirement for laser pulses versus altitude.

FIG. 4 includes a graph 400 depicting the optical pulse power of laser pulses versus altitude, and a graph 402 depicting $P_{crit}$ (i.e., the filamentation power requirement) for laser pulses versus altitude. In FIG. 4, reference number 406 represents the current altitude of the remote object under observation. For purposes of the example described herein, graph 400 may represent the optical pulse power of the secondary laser pulses directed at the outgas environment. The power of the secondary laser pulses increases, and the pulses become shorter, as they propagate through the atmosphere due to chirped pulse compression and focusing. In this regard, the characteristics of the secondary laser pulses will change as they propagate toward the remote object. At higher altitudes, the near-vacuum environment facilitates effective transmission of higher power laser pulses. As explained below, the increasing power trend of the secondary laser pulses (as depicted in graph 400) makes the filamentation of the secondary laser pulses easier to accomplish.

Graph 402 indicates how the value of $P_{crit}$ changes with altitude. As altitude increases, $P_{crit}$ also increases because the number of molecules in the atmosphere decreases with increasing altitude. As shown, $P_{crit}$ remains higher than the optical pulse power of the secondary laser pulses until the secondary laser pulses encounter the outgas environment generated by the initial laser pulses. At that point, $P_{crit}$ falls off due to the presence of the outgas environment proximate to the surface of the remote object. In this regard, the localized outgas environment introduces additional molecules proximate to the remote object, thus significantly reducing $P_{crit}$ in the outgas environment and enabling filamentation. FIG. 4 schematically depicts this reaction where the value of $P_{crit}$ falls rapidly until graph 402 intersects graph 400. This intersection point corresponds to the secondary laser pulse power exceeding the outgas environment critical power for onset of nonlinear processes leading to filamentation.

The value of $P_{crit}$ can be expressed as follows:

$$P_{crit} = \frac{(1.22\lambda)^2 \pi}{32 n_0 n_2}$$

Watts, where $\lambda$ is the wavelength of the secondary laser pulse, $n_0$ is the linear index of refraction of the laser transmission media (in this example, the atmosphere and/or the outgas environment), and $n_2$ is the nonlinear index of refraction of the laser transmission media. Furthermore, the total index of refraction n of the laser transmission media can be expressed as follows: $n=n_0+n_2 I$, where I is the intensity of the secondary laser pulse (W/cm$^2$). Thus, as $n_2$ increases, $P_{crit}$ decreases. In the example described herein, the outgas environment results in a significant increase in $n_2$, which causes the rapid reduction in $P_{crit}$.

Figure 5:
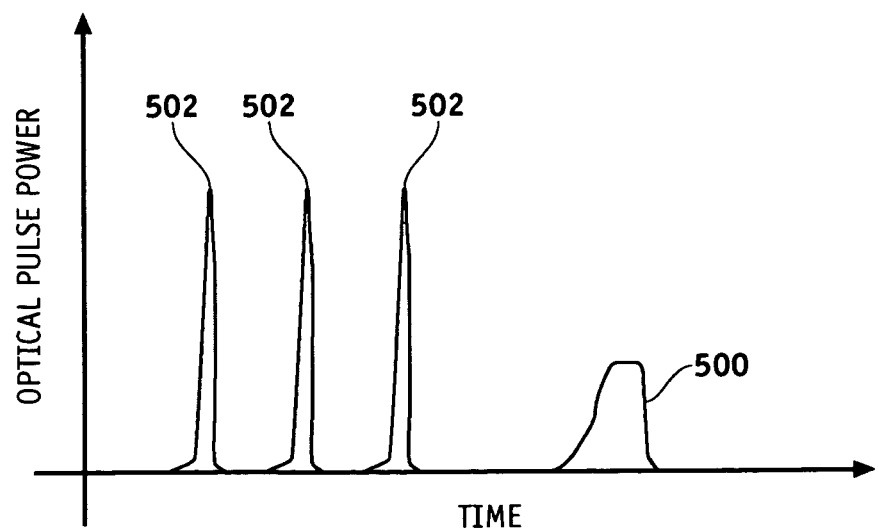
FIG. 5 is a graph depicting the optical pulse power of laser pulses versus time for initial and secondary laser pulses generated in accordance with an example embodiment of the invention.

FIG. 5 is a graph depicting the optical pulse power of laser pulses versus time for an initial laser pulse 500 and a number of secondary laser pulses 502 generated in accordance with an example embodiment of the invention. The pulse shapes depicted in FIG. 5 are merely schematic representations and actual laser pulses may assume different shapes. Initial laser pulse 500 represents a pulse (as described above) that heats the surface material of the remote object, thus generating gas emission from the surface material, increasing the local pressure, driving the $n_0 n_2$ product up, and driving $P_{crit}$ down. Immediately thereafter, secondary laser pulses 502 illuminate the outgas environment, causing filament formation in the localized gas atmosphere generated by initial pulse 500. As secondary laser pulses 502 travel through the atmosphere, they become very high in peak power before collapsing to form the filaments. FIG. 5 schematically depicts the relatively short, high power density characteristics of secondary laser pulses 502.

Figure 6:
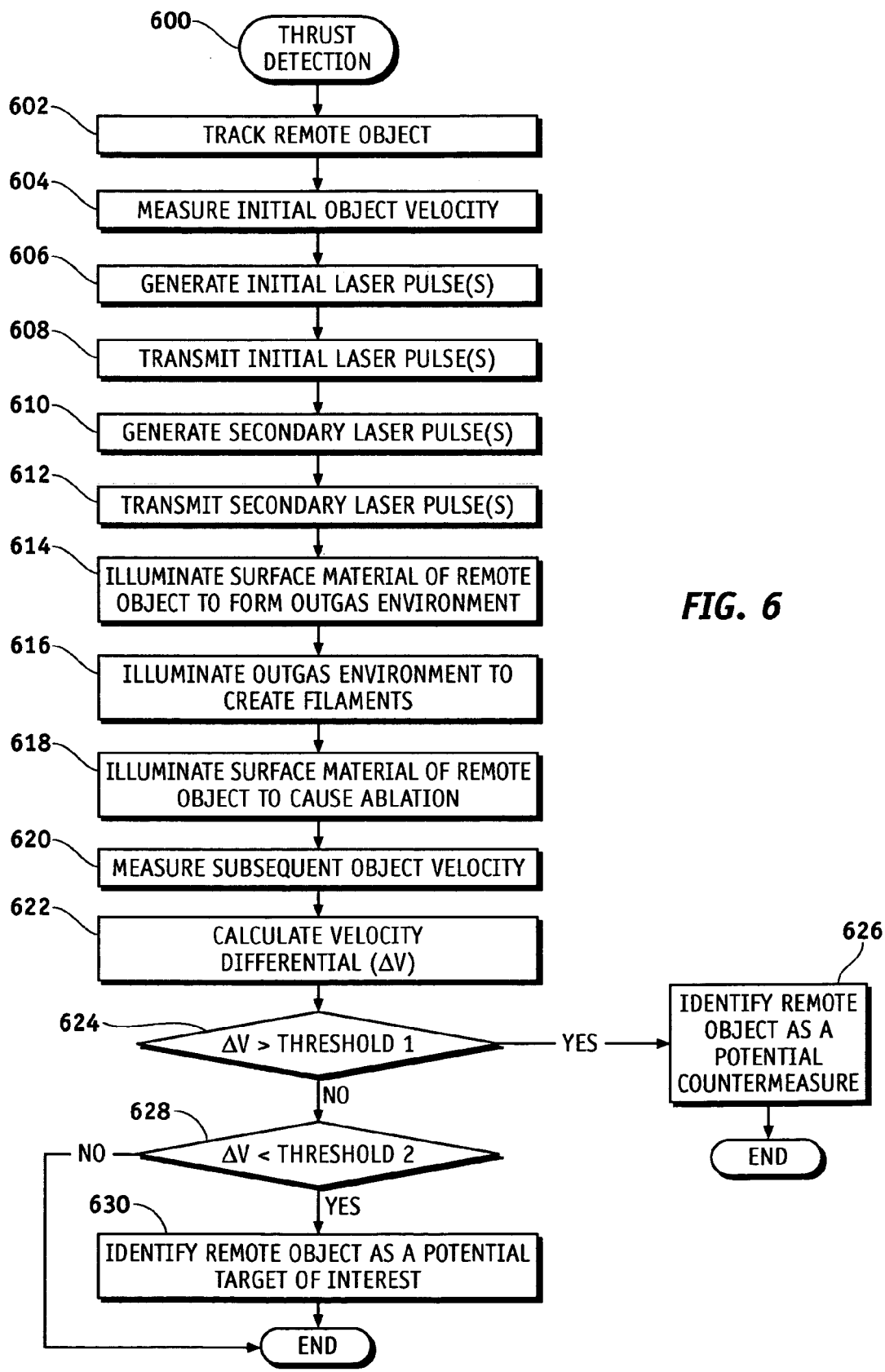
FIG. 6 is a flow chart of a thrust detection process that may be performed by a system configured in accordance with an example embodiment of the invention.

FIG. 6 is a flow chart of a thrust detection process 600 that may be performed by a system configured in accordance with an example embodiment of the invention. The various tasks performed in connection with process 600 may be performed by software, hardware, firmware, or any combination thereof. For illustrative purposes, the following description of process 600 may refer to elements mentioned above in connection with FIGS. 1-5. In practical embodiments, portions of process 600 may be performed by different elements of the described system, e.g., laser system 106, tracking subsystem 108, or thrust detection subsystem 110. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

Thrust detection process 600 may begin by tracking the current position of the remote object in real-time (task 602). Such tracking or monitoring is desirable to obtain the current position coordinates of the remote object under observation. In connection with such tracking, process 600 may also measure or otherwise obtain an initial velocity of the remote object (task 604). Task 604 may acquire the initial velocity using conventional technologies such as radar-based techniques. Eventually, process 600 generates one or more initial laser pulses (task 606) having the characteristics described above, namely, characteristics that promote outgassing of a surface material of the remote object. In addition, process 600 transmits and directs the initial laser pulses toward the remote object (task 608). Following the transmission of the initial laser pulses, thrust detection process 600 also generates one or more secondary laser pulses (task 610) having the characteristics described above, namely, characteristics that promote filamentation in reaction to the outgas environment that is created by the initial laser pulses. In addition, process 600 transmits and directs the secondary laser pulses toward the remote object (task 612). More specifically, laser system 106 directs the secondary laser pulses at the target area where the outgas environment will be created.

The transmission of the initial laser pulses illuminates the surface material of the remote object to form an outgas environment proximate to the remote object (task 614). As mentioned above, the outgas environment is generated in response to localized heating of the surface material caused by the initial laser pulses. In a practical embodiment, the outgas environment is quickly dissipated into the surrounding vacuum and, therefore, the secondary laser pulses are generated and transmitted such that they are temporally proximate to the initial laser pulses responsible for creating the outgas environment.

The transmission of the secondary laser pulses illuminates the outgas environment, causing filamentation of the secondary laser pulses into a number of filaments (task 616). In turn, the filaments illuminate the surface material of the remote object (task 618), causing ablation of the surface material and a resulting ejection of a portion of the surface material away from the remote object. As described above, the ejection of surface material away from the remote object imparts a thrust to the remote object. Accordingly, thrust detection process 600 may measure or otherwise obtain a subsequent velocity of the remote object (task 620). Task 620 may acquire the subsequent velocity using conventional technologies such as radar-based techniques.

Thrust detection process 600 may then calculate a suitable velocity differential (task 622) that is based upon the initial velocity obtained by task 604 and the subsequent velocity obtained by task 620. In practice, the velocity differential may be the absolute value of the difference between the initial and subsequent velocities, or a value, quantity, or expression that is generated by any suitable algorithm. Depending upon the direction of travel of the remote object relative to the direction of the ejected surface material, the subsequent velocity may be greater than or less than the initial velocity, and process 600 is configured to accommodate all practical scenarios. Process 600 may then compare the velocity differential to one or more threshold values to determine whether the remote object is likely to be a countermeasure or an actual target of interest. For example, if the velocity differential exceeds a first threshold value (query task 624), then process 600 may identify the remote object as a potential countermeasure, such as a decoy having a relatively low mass (task 626). If, however, the velocity differential is less than a second threshold value (query task 628), then process 600 may identify the remote object as a potential target of interest, such as a warhead having a relatively large mass(task 630). If neither condition is satisfied, then process 600 may end, generate an error signal, perform recalculations or retransmissions of the laser pulses, or the like. Although not a requirement of the invention, the first threshold value may be equal to the second threshold value in a practical embodiment. In the manner described herein, thrust detection process 600 can be utilized in a midcourse discrimination system to resolve whether a remote object is a decoy or an actual target of interest. Once that determination is made, appropriate action can be taken if necessary.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for inducing thrust at a remote object, said method comprising:

generating one or more initial laser pulses having characteristics that promote outgassing of a surface material of said remote object;

transmitting said one or more initial laser pulses toward said remote object;

generating one or more secondary laser pulses having characteristics that promote filamentation in response to outgassing of said surface material;

transmitting said one or more secondary laser pulses toward said remote object; and tracking a current position and velocity of said remote object.

2. A method according to claim 1, wherein transmitting said one or more initial laser pulses causes outgassing of said surface material and formation of an outgas environment proximate said remote object.

3. A method according to claim 2, wherein transmitting said one or more secondary laser pulses comprises directing said one or more secondary laser pulses at said outgas environment.

4. A method according to claim 3, wherein transmitting said one or more secondary laser pulses causes filamentation of said one or more secondary laser pulses into a number of filaments having high power density relative to said one or more secondary laser pulses.

5. A method according to claim 4, wherein transmitting said one or more secondary laser pulses causes said number of filaments to ablate said surface material, resulting in ejection of a portion of said surface material away from said remote object.

6. A method according to claim 1, wherein generating said one or more initial laser pulses is performed by a Q-switched laser system.

7. A method according to claim 1, wherein generating said one or more secondary laser pulses is performed by an ultra-short pulse laser system.

8. A system for inducing thrust at a remote object, said system comprising:

a first laser subsystem configured to generate one or more initial laser pulses having characteristics that promote outgassing of a surface material of said remote object;

a second laser subsystem configured to generate one or more secondary laser pulses having characteristics that promote filamentation in response to outgassing of said surface material;

an optical subsystem coupled to said first laser subsystem and to said second laser subsystem, said optical subsystem being configured to transmit said one or more initial laser pulses and said one or more secondary laser pulses;

a control subsystem coupled to said first laser subsystem and to said second laser subsystem, said control subsystem being configured to direct said one or more initial laser pulses toward said remote object, and to direct said one or more secondary laser pulses toward said remote object; and a tracking subsystem coupled to said control subsystem, said tracking subsystem being configured to track a current position and velocity of said remote object.

9. A system according to claim 8, wherein said one or more initial laser pulses causes outgassing of said surface material and formation of an outgas environment proximate said remote object.

10. A system according to claim 9, wherein said control subsystem is configured to direct said one or more secondary laser pulses at said outgas environment.

11. A system according to claim 10, wherein said outgas environment causes filamentation of said one or more secondary laser pulses into a number of filaments having high power density relative to said one or more secondary laser pulses.

12. A system according to claim 11, wherein said number of filaments ablate said surface material, resulting in ejection of a portion of said surface material away from said remote object.

13. A system according to claim 8, wherein said initial laser subsystem comprises a Q-switched laser system.

14. A system according to claim 8, wherein said second laser subsystem comprises an ultra-short pulse laser system.

15. A method for detecting thrust at a remote object, said method comprising:

measuring an initial velocity of said remote object;

illuminating a surface material of said remote object with one or more initial laser pulses having characteristics that promote outgassing of said surface material, forming an outgas environment proximate said remote object;

directing one or more secondary laser pulses toward said remote object, said one or more secondary laser pulses having characteristics that promote filamentation in reaction to said outgas environment;

measuring, after said directing step, a subsequent velocity of said remote object; and calculating a velocity differential based upon said initial velocity and said subsequent velocity.

16. A method according to claim 15, wherein said directing step causes filamentation of said one or more secondary laser pulses into a number of filaments having high power density relative to said one or more secondary laser pulses.

17. A method according to claim 16, wherein said directing step causes said number of filaments to ablate said surface material, resulting in ejection of a portion of said surface material away from said remote object.

18. A method according to claim 15, further comprising:

comparing said velocity differential to a threshold value; and identifying said remote object as a potential countermeasure if said velocity differential is greater than said threshold value.

19. A method according to claim 15, further comprising:

comparing said velocity differential to a threshold value; and identifying said remote object as a potential target of interest if said velocity differential is less than said threshold value.

* * * * *